Dec. 16, 1969  J. S. OLASZ ETAL  3,483,627
LINEAR TO ROTARY MOVEMENT INDICATING GAUGE
Filed April 18, 1967  3 Sheets-Sheet 2
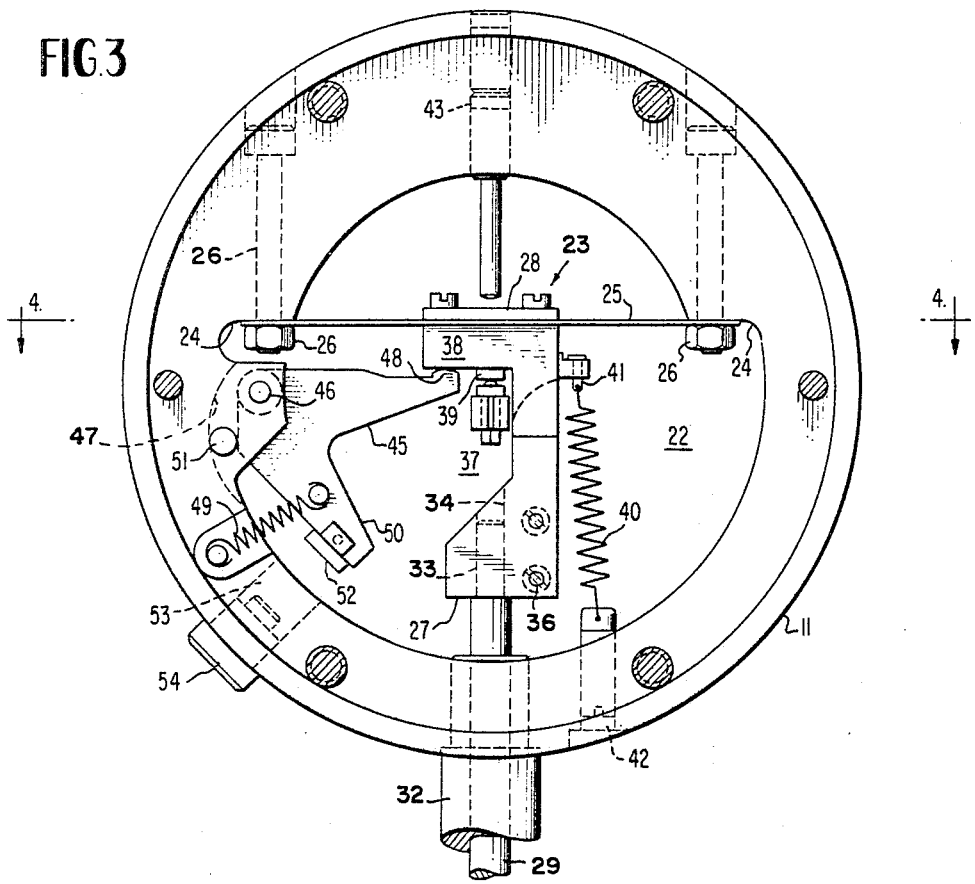
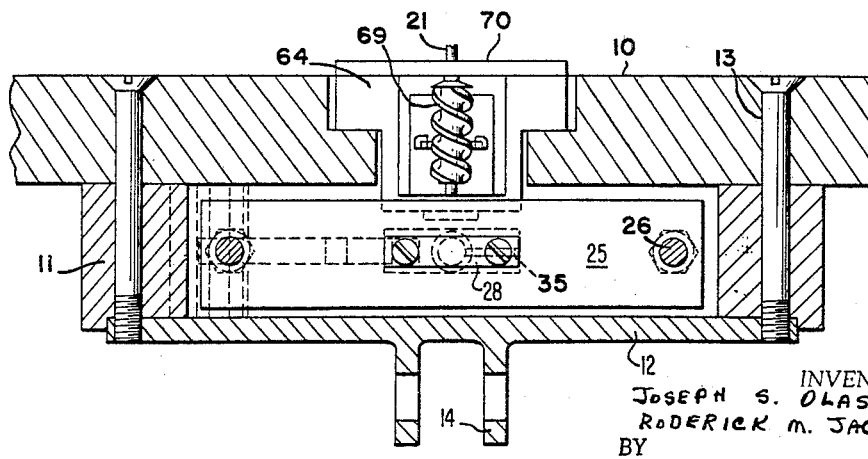
INVENTORS
JOSEPH S. OLASZ
RODERICK M. JACKSON
BY
*LeBlanc + Shur*
ATTORNEYS Dec. 16, 1969   J. S. OLASZ ETAL   3,483,627
LINEAR TO ROTARY MOVEMENT INDICATING GAUGE
Filed April 18, 1967   3 Sheets-Sheet 3
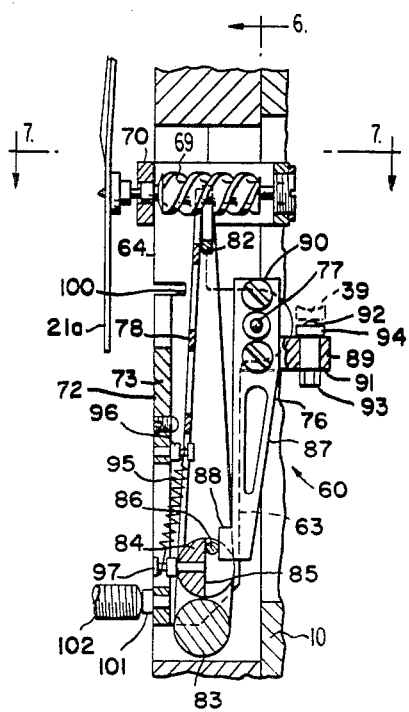
FIG.5
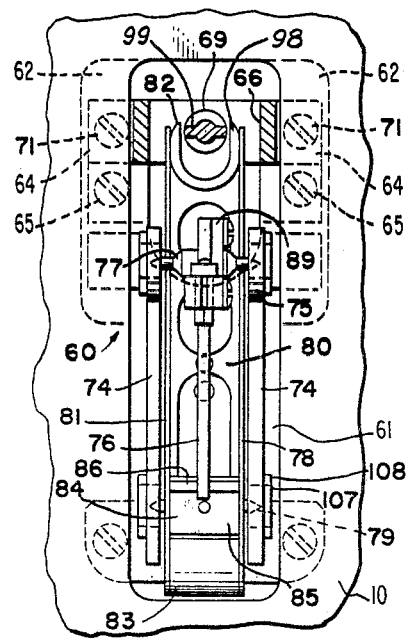
FIG.6
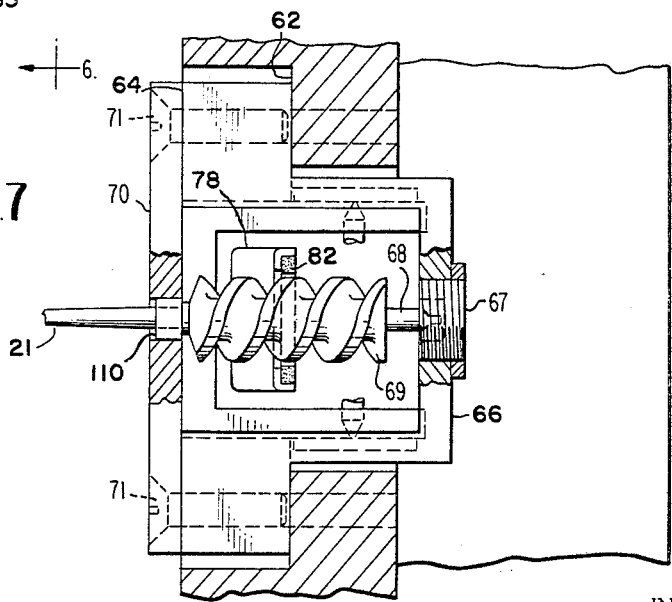
FIG.7
FIG.8
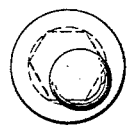
INVENTORS
JOSEPH S. OLASZ
RODERICK M. JACKSON
BY
*LeBlanc & Shur*
ATTORNEYS

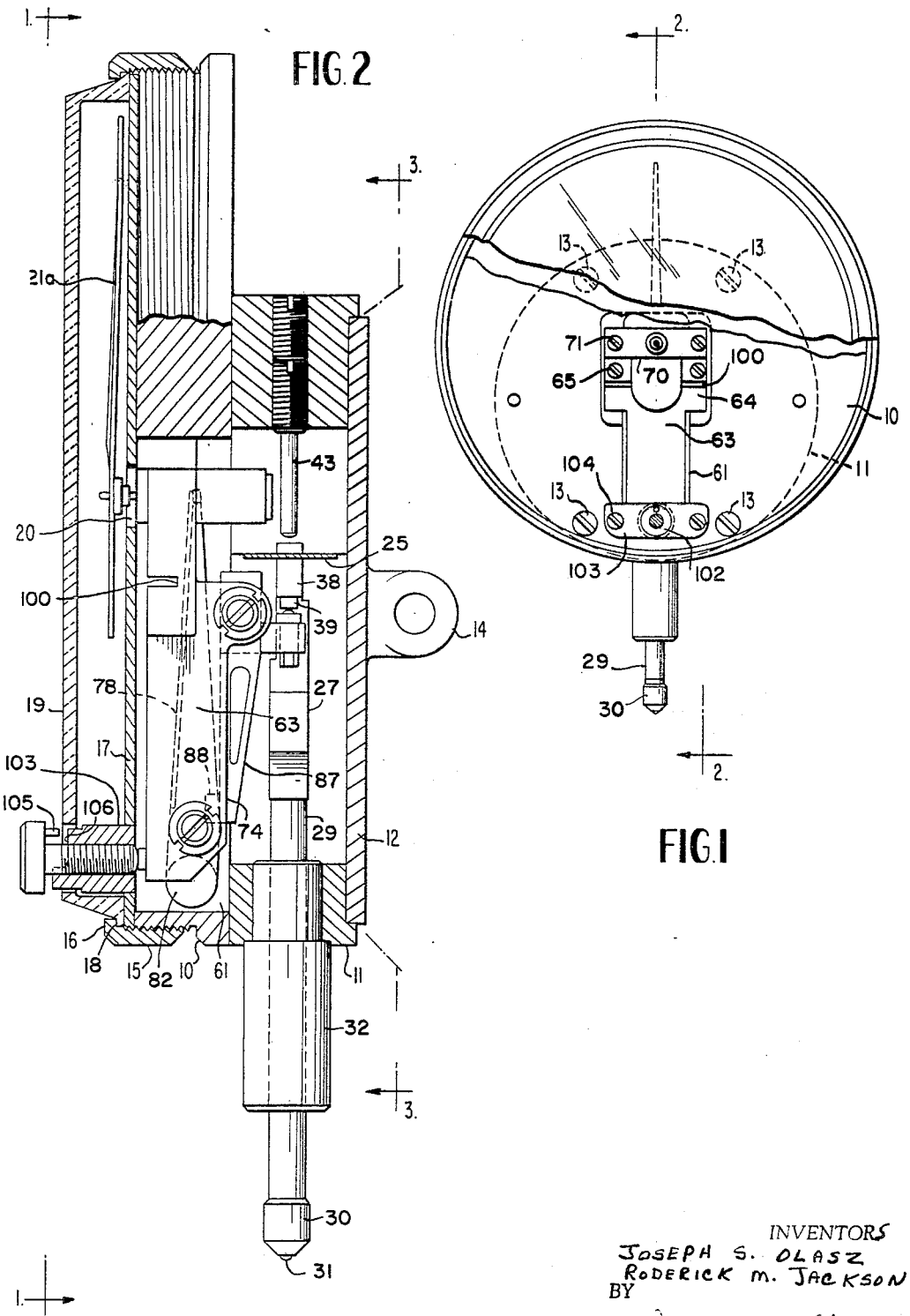

United States Patent Office 3,483,627
Patented Dec. 16, 1969

3,483,627
LINEAR TO ROTARY MOVEMENT INDICATING GAUGE
Joseph S. Olasz and Roderick M. Jackson, Lancaster, Pa., assignors to Hamilton Watch Company, Lancaster, Pa., a corporation of Pennsylvania
Filed Apr. 18, 1967, Ser. No. 631,804
Int. Cl. G01b 3/22, 5/00; G03b 1/64
U.S. Cl. 33—172                                                                      15 Claims

ABSTRACT OF THE DISCLOSURE

A dimensional measuring gage having an axially movable externally located sensing head connected to an internal actuating frame suspended from a leaf spring. Axial movement of the frame is transmitted to a rotary dial indicator through a motion translating assembly including a pair of levers, one of which mounts a horseshoe magnet arranged to traverse lengthwise along a helically grooved armature to rotate the attached indicator. A cantilevered frame member is secured to the gage body and mounts the armature and indicator at its secured upper end. The double levers are adapted to be selectively deflected to provide fine adjustment of the motion translating assembly. Opposite pivotal motion is imparted to the double levers in response to linear movement of the actuating frame.

BACKGROUND OF THE INVENTION

This invention relates to a measuring gage and particularly to a fine dimensional measuring gage of a type having a magnetically coupled lever arrangement for accurately translating linear movement into rotary indication thereof on a dial readout.

Conventional measuring gages have heretofore provided helix and lever arrangements to attain rotary indications on calibrated dials. The lever of each of these gages usually engages in the spiral grooves of its associated helix and moves substantially lengthwise along the axis thereof in response to rocking displacement of the lever by the article undergoing measurement to impart rotary motion to the helix and hence to a rotary indicator. The frictional mechanical engagement of the lever in the helix as well as the drag, lost motion, etc., encountered in gages of this type in translating the measuring rocking displacement into proper lever movement, preclude accurate precision measurement.

Substantially frictionless magnetically rotated helical armature arrangements have ben used in pressure gages to provide rotary dial readouts. In each of these, a magnet is spaced from and traverses the armature in direct response to movement of a pressure sensitive diaphragm. In this manner, mechanical connection between the armature and the force moving the magnet along the armature is eliminated and a substantially frictionless rotary response is thereby obtained. However, the magnet, in these known magnetic armature arrangements, is usually mounted on the free end of a cantilevered spring and is therefore free to flex under forces other than the primary measuring force, such as gravity. Lack of positive control of the magnet introduces slight errors in the measurement. Moreover, while these conventional magnetic armature arrangements provide satisfactory pressure measurements within a desired range of accuracy, it has heretofore been a problem to utilize a magnetically rotated armature in a dimensional gage for measuring extremely fine dimensions and accurately translate the linear displacement imparted to the gage by such measurement into a precision rotary indication on a dial.

SUMMARY OF THE INVENTION

The present invention provides a dimensional measuring gage having exceptionally high accuracy. For proper operation and to insure such accuracy, the gage of the present invention should be firmly mounted in a stand in such a manner that the article to be measured can be brought between the sensing head of the gage and the fixed base of the stand. The gage and article to be measured are arranged so that the desired measurement is reflected in translational displacement of the sensing head into the gage body. This displacement is converted to rotary displacement of an indicator or pointer on a calibrated dial through a substantially frictionless movement assembly which is adjustably mounted on the gage body. The present gage features a magnet spaced from a helical armature for rotating the latter without mechanical connection therebetween, a sensitive, substantially frictionless, double lever arrangement mounted on the movement assembly and disposed to positively control the movement of the magnet, an extremely fine adjustment for moving the rotary indicator to a zero position, a leaf spring suspension accommodating and limiting linear displacement of the sensing head, a measuring range adjustment, and means for manually lifting the sensing head suspension to provide a gap between the latter and the fixed stand.

It is therefore a primary object of the present invention to provide an accurate precision gage for extremely fine dimensional measurements.

It is another object of the present invention to provide a dimensional measuring gage having a substantially friction free movement.

It is another object of the present invention to provide a dimensional measuring gage which accurately translates linear movement of the measuring head into a rotary indication on a dial readout and which is operable for all orientations thereof.

It is still another object of the present invention to provide a dimensional measuring gage having an externally accessible fine adjustment for moving the indicator to a zero setting.

It is still another object of the present invention to provide a dimensional measuring gage having a magnetically coupled lever arm and armature arrangement wherein the movement of the magnet is positively controlled at all times and for all orientations of the gage.

It is a further object of the present invention to provide a dimensional measuring gage wherein the sensing head is suspended from a leaf spring thereby to limit translational movement of the sensing head and to provide substantially friction free movement thereof.

It is still a further object of the present invention to provide a dimensional measuring gage having a range adjustment wherein accurate measurement to various scales can be provided.

It is yet a further object of the present invention to provide a dimensional measuring gage having a minimum number of movable parts and arranged with a compact gage body.

Various other novel features of construction and advantages inherent in the measuring gage construction of the present invention are pointed out in the following detailed description of a typical embodiment thereof considered in conjunction with the accompanying drawings depicting the same wherein like numerals represent like parts throughout the various views.

BRIEF DESCRIPTION OF THE DRAWING FIGURES

FIGURE 1 is a front elevational view taken generally about on line 1—1 of FIGURE 2 of a measuring gage constructed in accordance with one form of the present invention and illustrating the lower portion thereof with the calibrated dial removed;

FIGURE 2 is an enlarged cross sectional view thereof taken about on line 2—2 of FIGURE 1;

FIGURE 3 is an enlarged fragmentary rear elevational view of the gage taken about on line 3—3 of FIGURE 2 and illustrating the actuating assembly therefor;

FIGURE 4 is an enlarged fragmentary cross sectional view thereof taken about on line 4—4 of FIGURE 3;

FIGURE 5 is a fragmentary cross sectional view of the motion translating assembly used in the present gage;

FIGURE 6 is a fragmentary cross sectional view thereof taken about on line 6—6 of FIGURE 5;

FIGURE 7 is an enlarged fragmentary cross sectional view thereof taken about on line 7—7 of FIGURE 5; and FIGURE 8 is an enlarged top plan view of an eccentrically mounted ball joining the actuating frame and motion translating assembly.

DESCRIPTION OF THE PREFERRED EMBODIMENT

The dimensional measuring gage illustrated in FIGURES 1 and 2 comprises a gage body including an externally threaded front disc-like housing 10, a reduced diameter rear disc-like housing 11 eccentrically positioned to abut the rear face of housing 10 so that the housing peripheries are tangent adjacent the lower portion of the gage body and a back plate 12 closing the rear face of housing 11, housings 10 and 11 and back plate 12 being fastened together as by screws 13. Plate 12 has a pair of outwardly projecting ears 14 for mounting the gage to a fixed stand, not shown. A bezel 15 having an inwardly extending lip 16 threads on housing 10 and clamps the calibrated dial 17 and the annual flange 18 of a transparent dial face 19 between lip 16 and the front face of housing 10. Disc 17 has a central opening 20 through which passes a shaft 21 mounting an indicating pointer 21a.

As best seen in FIGURE 3, rear housing 11 has a central opening 22 forming a cavity within which an actuating assembly, generally indicated 23, is mounted. The upper and lower peripheral surfaces of cavity 22 are generally semi-circular, the lower periphery being larger in diameter than the upper periphery. These semi-circular surfaces are joined along a common chord forming a pair of downwardly facing shoulders 24 to which a diaphragm leaf spring 25 is mounted by a pair of bolts 26. An actuating frame 27 is suspended from leaf spring 25 by a bolt and bracket arrangement indicated at 28. Frame 27 carries a spindle 29 having a contact point 30 preferably mounting a ball 31 which forms the tip of spindle 29 as best illustrated in FIGURE 2. Spindle 29 extends through a stem 32 suitably fixed to housing 11 and has a reduced diameter end portion 33 engaging in a bore 34 formed in the lower portion of frame 27. Frame 27 has a laterally opening medial slot 35, the opposite sides of which are urged together by screws 36 to clamp end portion 33 in bore 34. It is apparent that frame 27 is thus mounted for linear movement coaxially with spindle 29.

Frame 27 has a lateral cutout as at 37 forming an upper leg portion 38 which mounts a pad 39 on its underside in axial alignment with the axis of spindle 29 for purposes as will appear presently. A spring 40 connects between a lug 41 secured to frame 27 and an externally accessible adjusting screw 42 threaded into the side of housing 11 for returning actuator assembly 23 to the illustrated zero setting after linear movement thereof. An externally accessible and adjustable limiting pin 43 threads downwardly through the upper rim of housing 11, the lower end of pin 43 being adjustably spaced from bracket 28 to limit upward movement of actuator assembly 23.

Manually actuated means are provided for lifting actuating assembly 23 and comprise a bellcrank 45 pivotally mounted as at 46 in a laterally opening slot 47 formed medially between the faces of housing 11. Bellcrank 45 has a lifting lever 48 which engages the underside of frame leg portion 38 in a manner as to not normally exert any force thereon. Bellcrank 45 is restrained from lifting or counterclockwise movement as seen in FIGURE 3 by a spring 49 which connects between the other lever 50 of bellcrank 45 and housing 11 to bias bellcrank 45 clockwise against a dowel 51 extending across slot 47. A pad 52 is secured on lever 50 in registry with an opening 53 in housing 11, which opening is normally closed by a threaded plug 54. Thus, by removing plug 54 and replacing it with a conventional camera type triggering cable, not shown, actuating assembly 23 can be manually raised against the bias of diaphragm leaf spring 25 thereby to lift contact point 30.

As best seen in FIGURES 1, 5 and 6, a motion translating or movement assembly, generally indicated 60, is mounted in a vertically extending rectangular opening 61 formed through housing 10. The upper portion of opening 61 is located centrally of housing 10 and is laterally stepped along the outer face thereof to form a pair of vertically extending shoulders 62. Movement assembly 60 is supported by a cantilevered frame member 63 having a pair of upper leg portions 64 fastened to housing 10 against shoulders 62 by screws 65. As best seen in FIGURE 7, a U-shaped bracket 66 extends integrally and rearwardly from and joins the upper portion of legs 64 to form a bearing support as at 67 for the rear trunion 68 of a helix center shaft or armature 69. A plate 70 is secured across the front face of leg portions 64 as by screws 71 and is centrally apertured to provide a bearing support for the front trunion shaft 69.

The central and lower portions of frame member 63 comprise an integrally depending channel member 72 having a front web 73 and inwardly extending side flanges 74. A pair of ears 75 project inwardly from the upper portion of flanges 74 and pivotally mount the upper end of an inner lever 76 as by a bearing 77. As seen in FIGURE 6, the lower end of a channel-shaped outer lever 78 is pivotally mounted as by bearings 79 between flanges 74 adjacent the lower end of channel member 72, lever 78 having a web 80 which has portions cut out to reduce its weight (FIGURE 6) and flanges 81. Channel-shaped lever 78 nests in spaced relation within channel member 72 and has a horseshoe magnet 82 suitably secured at its upper end between flanges 81. The ends of magnet 82 are spaced from and straddle helix shaft 69. A weighted pin 83 is secured at the lower end of lever 78 between flanges 81 and below pivotal mounting 79 to counterbalance the weight of magnet 82. A cylindrical cross bar 84 having an axis coincident with pivot axis 79 is secured between flanges 81 and is cut lengthwise along its axis to provide an inwardly directed planar face 85. A pin 86 is slightly upwardly offset from the pivotal axis 79 of lever 78 and is secured between flanges 81 against face 85.

Inner lever 76 comprises a generally rectangular member having an inclined inner lower edge 87 so as not to interfere with frame 27 when pivoted counterclockwise as seen in FIGURE 2. The lower end of lever 76 has a jewel tip 88 on its opposite edge positioned to bear against lever pin 86. An L-shaped bracket 89 is secured to the upper side face of lever 76 as by screws 90 and the lower leg 91 thereof projects rearwardly to provide a support for a ball 92. However, leg 91 also projects laterally to lie in the plane of lever 76 and has a vertical bore and slot providing an interference fit for a pin 93 having a head 94 on which ball 92 is eccentrically mounted as seen in FIGURE 8. Ball 92 is thus closely spaced adjacent the pivotal mounting 77 of lever 76 and provides a short moment arm therewith.

Ball 92 is held in following engagement against the undersurface of pad 39 by a spring 95 which extends between a pin 96 secured to web 73 of support member 63 and a like pin 97 secured to cross bar 84. Lever 78 is thus continuously biased for pivotal movement in a clockwise direction as seen in FIGURE 5. Pivotal movement of lever 78 is however restrained by lever 76 which, in turn, is constrained from pivotal movement by the engagement between tip 88 and pin 86 and between ball 92 and pad 39, the former engagement tending to rotate lever 76 counterclockwise while the latter engagement prevents such counterclockwise movement. That is to say, spring 95 constrains lever 78 into following engagement with the tip 88 of lever 78. Lever 76 is also constrained by spring 95 and lever 78 into following engagement with actuating assembly 23.

In use, the gage is mounted on a fixed stand, not shown, by ears 14 and an article to be measured is placed between ball 31 and the base of a stand, not shown. Movement assembly 60 converts the resulting translational motion of actuating assembly 23 into pivotal or rocking motion of lever 78 whereby magnet 82 traverses lengthwise along helix shaft 69 to rotate indicator 21a in a manner to be described. As best seen in FIGURE 3, upward linear displacement of actuating frame 27 releases levers 76 and 78 for counterclockwise and clockwise movement respectively under the bias of spring 95 whereby ball 92 is maintained in following engagement against pad 39 and magnet 82 is caused to traverse rearwardly along armature 69. When the article is removed from the measuring position, spring 40 returns frame 27 to its original position, causing levers 76 and 78 to pivot clockwise and counterclockwise respectively against the bias of spring 95, whereby magnet 82 traverses forwardly along helix shaft 69 to its original position. Note that the foregoing arrangement positively controls the movement and hence the position of magnet 82 relative to armature 69 and this is accomplished for all orientations of the gage.

To translate the traversing movement of magnet 82 along helix shaft 69 into rotary displacement of indicator 21a, magnet 82 and armature 69 are magnetically coupled thereby to coact to provide rotary movement of shaft 69 in response to lengthwise movement of magnet 82 therealong. Accordingly, armature 69 is formed of a magnetically susceptible material, such as soft iron, and is spirally grooved to comprise, in the illustrated form, a uniform double helix. It will be understood that a single helix or multiples thereof can be utilized to provide variations in translational to rotary ratios and that a single or multiple helically grooved shaft having non-uniform spiraling can also be provided whereby response in various scales, such as logarithmic scales, can be attained.

As noted in FIGURE 6, the legs or poles 98 of magnet 82 straddle the lands 99 of helix 69 in spaced relation thereto. The magnetic coupling between magnet 82 and shaft 69 is such that lands 99 are attracted to legs 98 whereby shaft 69 is constrained to rotate to a position providing a minimum gap between lands 99 and magnetic poles 98. Thus, the rotary position of indicator 21a in either direction is positively controlled by the position of magnet 82 along the axis of helix shaft 69. It will be noted that magnet 82 transcribes the arc of a circle as it traverses the length of armature 69 and may thereby introduce minute variations in the linear ratio between the translational motion of actuator assembly 23 and the rotary displacement of indicator 21a. To eliminate any errors which may thus be introduced, dial 17 can obviously be calibrated non-linearly or armature 69 be non-uniformly spiralled.

Fine and initial adjustment of the movement assembly is provided by flexing the lower end of support member 63 to thereby cause adjustment of magnet 82 along armature 69 and slight rotary displacement of indicator 21a into a desired adjusted position. To this end, legs 64 are slotted as at 100 along their outer faces to form an area of reduced thickness 107 providing a hinge about which the channelized lower end of frame member 63 may be flexed. An abutment pad 101 is suitably fastened on the outer face of web 73 adjacent the lower end of member 63 and lies in registry with a fine adjusting screw 102 which threads through a bracket 103 secured to the lower portion of housing 10 as by screws 104. Dial face 19 is suitably apertured to receive screw 102 which is of the type having a lug 105 for engaging shoulders 106 on bracket 103 to limit the range of adjustment. Since the movement assembly is balanced between the biasing forces of springs 95 and 25, pressure applied to the lower end of support member 63 by threading or unthreading screw 102 flexes channel member 72 about the hinge causing springs 95 and 25 to flex and maintain the balanced relation across movement assembly 60 whereby magnet 82 is slightly displaced lengthwise along armature 69 causing rotary displacement of indicator 21a to its adjusted or zero position.

A range adjustment is provided by the foregoing eccentrically mounted ball 92 and arm 91. By rotating pin 93, the length of the moment arm between pivotal mounting 77 of lever 76 and the actuator assembly engaging surface of ball 92 can be selectively varied. Accordingly, for the same linear displacement of actuator assembly 23, the rotary displacement of indicator 21a can be adjusted to a larger or smaller extent depending on the decrease or increase in length of the moment arm respectively as selectively determined by the position of ball 92 relative to pivotal mounting 77. Note that pin 93 is readily accessible upon removal of back cover 12.

In order to insure that movement assembly 60 and armature 69 are substantially friction free movements and to eliminate end and radial shake, both pivotal mountings 77 and 79 for lever 78 and 76, respectively, and the bearing mountings for armature 69 are provided with precision bearings. To this end, miniature ball bearings, not shown, are carried within the inner ends of set screws 107 which engage through ears 75 and flanges 74 of frame member 63 and receive the associated pivots 77 and 79. Suitable locknuts 108 are provided on the outer ends of set screws 107. Sapphire jewel bearings 106 mount trunnions 21 and 68 of helix shaft 69 in brackets 66 and 70 respectively (FIGURE 7). Inner bearing 67 includes adjustable set screw and locknut arrangement while outer jewel bearing 110 is fixed to bracket 70.

In summary, it will be seen that pivotal movement of lever 78 causes the magnet 82 to traverse substantially lengthwise along helix shaft 69. The magnetic coupling between magnet 82 and shaft 69 causes shaft 69 to rotate the dial hand 21a. As seen in FIGURE 5, lever 78 is biased for movement by spring 95 in a clockwise direction with such movement being restrained by lever 76, particularly the engagement of pin 86 against tip 88 of lever 76. Pivoted lever 76 is, in turn, restrained against counter clockwise movement, under the counter clockwise bias imparted thereto by lever 78, by the engagement between ball 92 carried by lever 76 and the pad 39 carried by the frame 27 of motion translating assembly 23. Thus, ball 92 is constrained into following engagement with the actuating assembly 23 which, in turn, is mounted for reciprocating movement by spindle 29. Accordingly, reciprocating movement of bracket 27 is translated into opposite rotary movement of the levers 76 and 78 and finally into a rotary movement of the dial hand 21a through the magnetically coupled lever and helix shaft assembly.

It is thus apparent that the objects of the invention have been fulfilled. The foregoing gage is substantially friction free and efficiently and effectively translates linear displacement onto a rotary indicator without significant error, thereby providing an extremely accurate fine dimensional gage. Moreover, the gage is easily utilized, readily adjusted and can be applied over a variety of measuring ranges. The movement assembly is under positive control for all gage orientations, has a minimum number of parts, and is arranged within a compact body.

The invention may be embodied in other specific forms without departing from the spirit or essential characteristics thereof.

What is claimed and desired to be secured by United States Letters Patent is:

1. A dimensional measuring gage comprising a housing, spring means secured to said housing, an actuating member including an externally located measuring head, said actuating member being secured to said spring means and adapted for linear movement from a predetermined position, a motion translating assembly carried by said housing including a pair of pivotally mounted levers, a rotary indicator, a helically grooved shaft mounted within said housing and operably connected to said rotary indicator, magnet means carried on the end of one of said levers and spaced about said shaft, said magnet means being magnetically coupled to said shaft and arranged to traverse substantially lengthwise along said shaft to rotate the said shaft in response to pivotal movement of said one lever, and means constraining the other of said levers in following engagement with said actuating member and said one lever in following engagement with said other lever whereby linear movement of said actuating member from said predetermined position is translated into rotary movement of said indicator.

2. A measuring gage according to claim 1 including a cantilevered frame member secured to said housing and supporting said motion translating assembly, means including a fine adjustment screw threaded through said housing for flexing said frame member to pivot said levers whereby said magnet is selectively and adjustably positioned along said shaft to thereby selectively adjust the rotary position of said indicator.

3. A measuring gage according to claim 1 wherein said spring means includes a leaf spring having opposite ends secured to said housing, said actuating means being secured to said spring and extending normally therefrom and means for returning said actuating member to said predetermined position after linear movement thereof.

4. A measuring gage according to claim 3 including a lever arm pivoted to said housing and having a free end adapted to engage said actuating member, said lever arm being adapted for swinging movement to linearly displace said actuating frame against the bias of said leaf spring and means for returning said lever to its original position.

5. A measuring gage according to claim 1 wherein said levers are pivoted about spaced parallel axes and extend in substantially opposite parallel directions from their respective pivotal axes, said other lever engaging said one lever at a point intermediate the pivotal mountings of said levers whereby movement of said actuating member in either direction causes said levers to rotate in opposite directions.

6. A measuring gage according to claim 5 wherein said other lever has an arm member projecting therefrom and extending in a direction normal to the pivotal mounting thereof, said arm member being adapted to engage said actuating member to follow the movement thereof.

7. A measuring gage according to claim 5 including an elongated cantilevered frame member secured to said housing and supporting said motion translation assembly, said one lever being pivotally mounted adjacent the free end of said frame member, said other lever being pivotally mounted adjacent the fixed end of said frame member, means including an externally accessible fine adjustment screw threaded through said housing and engaging the free end of said frame member to flex the latter whereby said magnet is selectively and adjustably positioned along said shaft to thereby selectively adjust the rotary position of said indicator.

8. A measuring gage according to claim 7 wherein said other lever has an arm member projecting therefrom and extending in a direction normal to the pivotal axis thereof, said arm member being adapted to engage said actuating member to follow the movement thereof.

9. A measuring gage according to claim 1 wherein said other lever has an arm member projecting therefrom adjacent its pivotal mounting, a ball carried by said arm member adjacent the free end thereof and adapted to bear against said actuating member, and means adjustably mounting said ball on said arm member whereby the distance between the bearing surface of said ball and the pivotal mounting of said other lever can be selectively adjusted.

10. A measuring gage according to claim 1 wherein said housing has a calibrated dial secured to the front face thereof and underlying said indicator, said housing having an opening through the front face thereof, an elongated cantilevered frame member secured to said housing within said opening with the fixed end thereof located centrally of said housing, a bracket extending rearwardly from the fixed end of said frame member and providing a rear bearing support for said armature, means providing a front bearing support for said shaft, said frame member having rearwardly projecting bearing supports adjacent the free and fixed ends thereof, said one lever being pivotally mounted by the free end bearing supports and carrying an abutment closely adjacent to but spaced from the pivotal mounting thereof, said other lever being pivotally mounted by the fixed end bearing supports and extending into engagement with said abutment on said one lever, the pivotal axes of said levers extending in spaced parallel relation, a rearwardly extending arm member carried by said other lever and adapted to engage said actuating member, said arm member projecting from said other lever in a direction normal to the pivotal axis thereof, said constraining means including a spring biasing said one lever such that movement of said actuating frame in either direction causes said levers to rotate in opposite directions, and means including an adjusting screw threaded through the front face of said housing and engaging the free end of said frame member for flexing the same and thereby selectively adjusting the rotary position of said indicator on said dial.

11. A dimensional measuring gage comprising a housing, support means secured to said housing, an actuating member including an externally located measuring head, said actuating member being carried by said support means for linear movement, a motion translating assembly carried by said housing including a pair of pivotally mounted levers, a rotary indicator, a helically grooved shaft mounted within said housing and operably connected to said rotary indicator, magnet means carried adjacent the end of one of said levers and spaced about said shaft, said magnet means being magnetically coupled to said shaft and arranged to traverse substantially lengthwise along said shaft to rotate said shaft in response to pivotal movement of said one lever, and means biasing said one lever in following engagement with said other lever and the other of said levers in following engagement with said actuating member whereby linear movement of said actuating member from said predetermined position is translated into rotary movement of said indicator.

12. A gage according to claim 11 wherein said levers are pivotally mounted for rotary movement about axes extending substantially parallel one to the other and substantially normal to the direction of linear movement of said actuator member.

13. A gage according to claim 12 wherein said shaft is rotatable about an axis substantially normal to the axes of rotation of said levers and to the direction of linear movement of said actuator member.

14. A measuring gage according to claim 11 wherein said levers are pivoted about spaced parallel axes and extend in substantially opposite parallel directions from their respective pivotal axes, said other lever engaging said one lever at a point intermediate the pivotal mountings of said levers whereby movement of said actuating frame in either direction causes said levers to rotate in opposite directions.

15. A measuring gage according to claim 14 wherein said other lever has an arm member projecting therefrom and extending in a direction normal to the pivotal mounting thereof, said arm member being adapted to engage said actuating member to follow the movement thereof.

References Cited

UNITED STATES PATENTS

| | | |
|---|---|---|
| 1,966,424 | 7/1934 | Ames. |
| 2,345,845 | 4/1944 | Wells. |
| 2,476,713 | 7/1949 | Emery. |
| 2,509,644 | 5/1950 | Kinderman _____ 73—317 |
| 2,643,460 | 6/1953 | Dietert et al. |
| 2,741,032 | 4/1956 | Emery. |
| 2,911,726 | 11/1959 | Zelnick. |

LOUIS R. PRINCE, Primary Examiner

DANIEL M. YASICH, Assistant Examiner

U.S. Cl. X.R.

74—89.15, 99; 116—129